Nov. 26, 1946.    E. LABIN ET AL    2,411,547
PULSE WIDTH MEASURING SYSTEM
Filed March 26, 1943
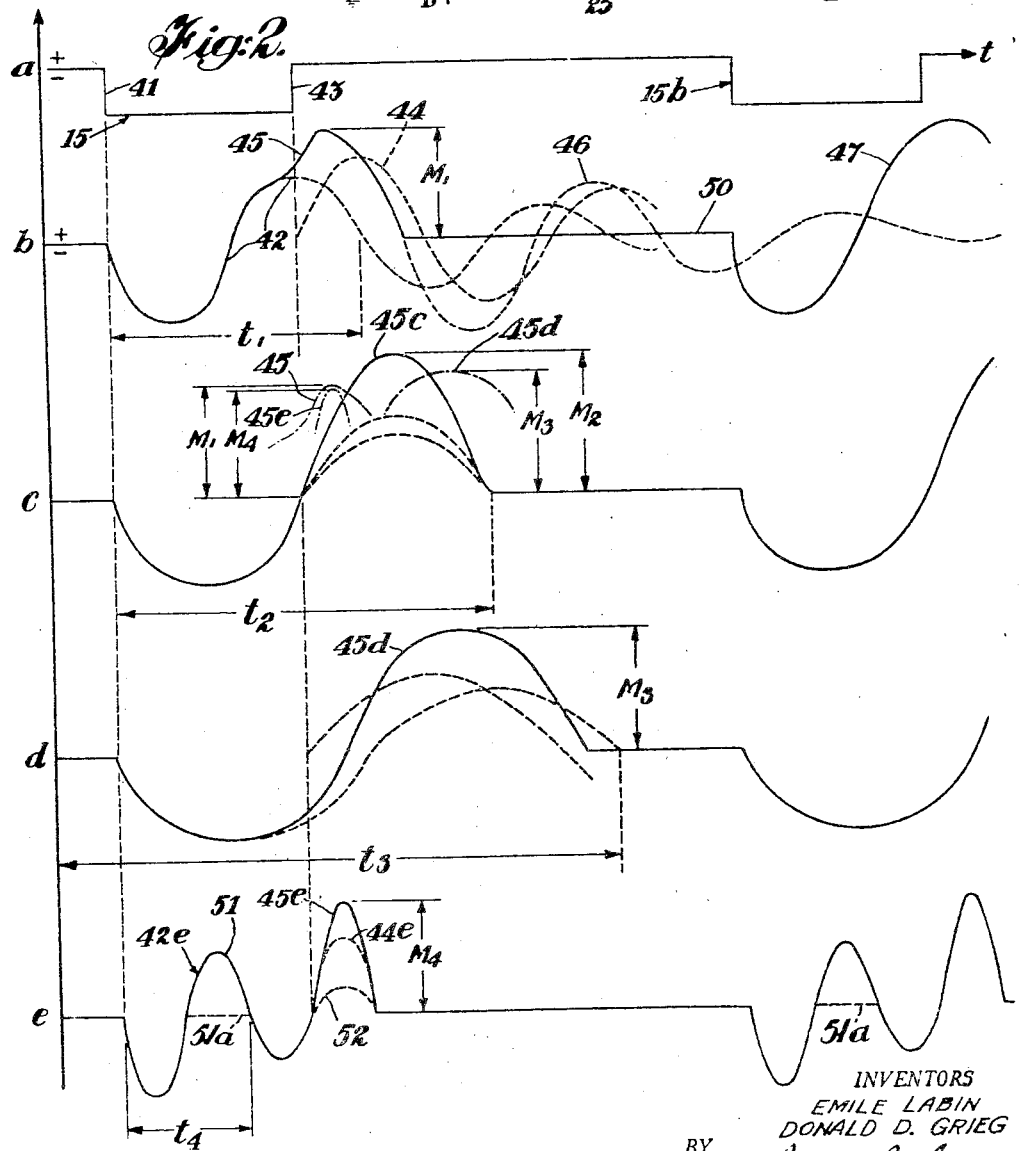
INVENTORS
EMILE LABIN
DONALD D. GRIEG
BY
Percy P. Lantz
ATTORNEY Patented Nov. 26, 1946

2,411,547

UNITED STATES PATENT OFFICE 2,411,547

PULSE WIDTH MEASURING SYSTEM

Emile Labin, New York, and Donald D. Grieg, Forest Hills, N. Y., assignors to Federal Telephone and Radio Corporation, Newark, N. J., a corporation of Delaware Application March 26, 1943, Serial No. 480,624

13 Claims. (Cl. 171—95)

This invention relates to radio impulse systems and more particularly to the measurement of the duration or width of pulses.

One of the objects of this invention is to provide a relatively simple method and means for measuring the widths of substantially rectangularly-shaped pulses.

Another object of the invention is to provide a pulse width measuring system requiring only a few parts and by which the width of pulse shapes of substantially rectangular form can be readily determined by a simple operation.

In accordance with our invention, a pulse measurement is made by applying a train of the pulses to a shock excitable resonant circuit whereby the leading and trailing edges of each pulse shock excite the circuit to produce oscillations. The oscillations produced by the edges of each pulse combine to form an undulation following the trailing edge of the pulse. The oscillations which normally follow this undulation are damped out by providing a damping shunt connection across the resonant circuit. This shunt connection includes a vacuum tube which when made conductive provides a low resistance path across the resonant circuit thereby lowering the "Q" of the circuit to such a value as to absorb quickly the oscillating energy. The grid of the tube is arranged to receive a negative voltage for the duration of each pulse while the pulse is applied to the resonant circuit. The anode and cathode of the tube are so connected that when the polarity of the current in the resonant circuit is in one direction it blocks conduction by the tube and when in the opposite direction it unblocks the tube. By this arrangement, the tube operates to suppress the oscillations which would normally follow the desired undulation by the tube becoming conductive when the voltage across the resonant circuit changes in polarity at the end of the undulation and when the voltage of the applied pulse becomes zero.

The system according to our invention will, therefore, produce an undulation following the trailing edge of each pulse and thereafter suppress all further oscillations until the next succeeding pulse is applied to the circuit.

By providing the resonant circuit with an amplifier stage and a maximizing and minimizing indicating meter or other maximizing or minimizing indicator, such as a cathode ray oscillograph, an operator can easily determine when the circuit is tuned to the fractional period corresponding to the duration of the pulse. That is to say, the leading and trailing edges of the pulse are then in either direct step or opposition with the induced oscillations of the circuit. The tuning control of the circuit may be calibrated to give a direct reading of the pulse width when the greatest maximum or minimum indication for the undulation is obtained.

For a further understanding of the invention, reference may be had to the following detailed description to be read in connection with the accompanying drawing, in which:

Fig. 1 is a schematic wiring and block diagram of the pulse width measuring system according to our invention; and Fig. 2 is a graphical illustration of the steps carried out by the system during a tuning operation.

Referring to Fig. 1, the pulse width measuring circuit is shown provided with an input connection 10 having a coupling stage 12 which is preferably a screen grid stage, whereby positive pulses 15 are inverted as indicated at 15a for application to the resonant circuit 16. In addition to inverting the pulses this coupling stage presents a high resistance with respect to the applied voltage so that the total current flow into the following circuit is an exact replica of the applied pulse. Connecting the output 17 of the coupling stage 12 to the resonant circuit 16 is a resistor R. The resonant circuit includes an adjustable condenser C and an inductance coil L. The condenser and the coil are connected in parallel. Connected across the terminals 18 and 19 of the inductance coil L is a damping tube 20. The output connection 17 is connected by lead 22 to a grid 23 of the tube. The cathode 24 is connected to the terminal 18 and the anode 25 is connected to the terminal 19. The terminal 19 is also connected to a source of positive potential B+. Condenser $C_1$ represents a low return impedance to ground and is not part of the resonant circuit.

The potential of the resonant circuit present at the terminal 18 is taken off at an output 26 for application to an amplifier stage 30 which is preferably arranged to operate as a class "C" amplifier. The anode connection 32 of the amplifier 30 is connected to a meter 34 the opposite side of which is connected to a positive potential B+. The meter 34 may be of any suitable character so long as it gives an indication of peak voltage of the undulations passed by the amplifier 30 to the anode circuit 32.

The operation of the system of Fig. 1 will be better understood by reference to Fig. 2 in which all curves are applied to the same time base. Curve a represents the pulse input after passing the coupling stage. Thus, the pulses 15 are negative at this point in the circuit. Should the input pulses be negative instead of positive the coupling stage 12 could be replaced with an input resistance. For purposes of illustration, the pulses 15 of curve a may also be regarded as the voltage across the resistor R since the total current that flows into the tuned circuit will be an exact replica of the applied input voltage.

Curve b represents the oscillations at the output 26 of the circuit 16 when the circuit is tuned to a wavelength or period t1 which is less than twice the duration of the pulse 15. Curve c represents the output potential of the circuit 16 when the circuit is tuned to a wavelength t2 which is substantially twice the duration of the pulse 15. Curve d represents the output potential of the circuit 16 when the circuit is tuned to a wavelength t3 which is greater than twice the duration of the pulse 15. Curve e represents the output potential of the circuit 16 when the circuit is tuned to a wavelength t4 which is in the order of an odd multiple of the duration of the pulse.

Referring particularly to the curves a and b, the leading edge 41 of the pulse will initiate an oscillation 42. When the trailing edge 43 is applied to the circuit 16, it initiates a second oscillation 44. Since the tuning of the circuit 16 is out of step with the width of the pulse 15, the oscillations 42 and 44 are out of step. These oscillations combine algebraically to produce an undulation 45.

Assuming that the damping tube 20 is removed from the circuit of Fig. 1, the oscillations 42 and 44 will continue to combine beyond the undulation 45 thereby producing a damped oscillation 46 shown in broken lines in curve b. For a resonant circuit of relatively high "Q" the oscillation 46 would be present when the next succeeding pulse 15b is applied to the circuit. It will be apparent from the curve b that this oscillation 46 in such case will combine with the oscillations produced by the pulse 15b thereby affecting the shape of the undulation 47 which would be normally produced by the pulse 15b.

As hereinbefore explained the damping tube 20 is provided to damp out the oscillations such as 46 which would normally follow undulations 45, 47, etc., so that the oscillations produced by one pulse will not affect the oscillations produced by the next succeeding pulse. This damping out operation is performed when the tube 20 is rendered conductive as when the undulation 45 reaches the zero potential of the curve b. Thus, when the energy of the circuit 16 starts to reverse in polarity at the terminals 18 and 19, the tube is rendered conductive thereby reducing the "Q" of the circuit 16 to such a value as to absorb the oscillatory energy of the circuit. This absorption of the oscillatory energy is such as to substantially completely damp out the oscillations that would normally follow the undulation 45. This results in a zero potential line 50 following the undulation 45 until the next succeeding pulse is applied to the circuit.

The conduction of the tube 20 is prevented during the application of a pulse to the circuit 16 by the connection 22 whereby the negative energy of the pulse (curve a) is applied to the grid 23 of tube. This insures the blocking of the tube against conduction for the duration of the pulse, and after the trailing edge of the pulse, the undulation 45 being positive at the terminal 18 prevents the tube from conduction for the duration of the undulation.

By adjusting the condenser C, the undulation 45 may be minimized or maximized. The adjustment for the condition of curve b will give a meter indication M1 while the tuning adjustment represented by curves c, d and e will give meter indications M2, M3 and M4, respectively. These indications are represented on curve c whereby a comparison may be easily seen. It will be clear that the undulation indication 45c of curve c represents the maximum obtainable by adjustment of the condenser C. Thus, the period t2 which represents adjustment of the condenser C for the condition illustrated in curve c is the period which is substantially twice the duration of the pulse 15. The calibration of the condenser C, of course, will be such as to give a direct indication in microseconds of the width of the pulse maximized, this indication being dependent only on the passive elements C and L.

For increased measurement range, additional inductance coils may be provided together with switching means for substituting selectively a coil of desired inductance value for the inductance coil L. In that case, the condenser C will be provided with a separate calibration for each coil. A tuning arrangement of this character is disclosed in the copending application of Donald D. Grieg entitled "Measuring system," Serial No. 475,734, filed February 13, 1943.

In the case of the circuit being tuned so that an odd multiple of half-periods occur during the pulse width, an example is indicated by curve e, wherein the wavelength is 1½ times the pulse width. It will be noted that the maximized undulation 45e is less than the maximum undulation indication 45c (curve c). The reason for this difference will be readily apparent from curve e because of the damped condition of the oscillation 42e produced by the leading edge 41. The second positive undulation 52 of the oscillation 42e is considerably less than the first positive undulation 51. Since it is the second undulation 52 which is in step with the undulation 44e produced by the trailing edge 43, the undulation 45e resulting from the combining action of the undulation 44e and 52 is less than the maximized indication 45c. Thus, while 45e represents a maximized indication for a wavelength in the order of an odd multiple of the pulse width, it is clear that such maximizing operation does not produce the greatest maximum indication possible.

In general a maxima is obtained when the period of the tuned circuit is such that:

$$t = \frac{2w}{n_1}$$

where $w$ is the width of the pulse and $n_1$ is an odd integer corresponding to the number of half periods occurring during the pulse time.

A minima is obtained when:

$$t = \frac{2w}{n_2}$$

where $n_2$ is an even integer corresponding to the number of half periods within the pulse time.

In order to prevent the undulation 51 from being applied to the meter 34 for the tuning condition illustrated in curve e, the negative potential of the pulse 15 (curve a) is applied to the amplifier stage 30 through a connection 55. This negative potential for the duration of the pulse 15 is used to block out the amplifier in known manner so that for the duration of the pulse any positive undulations produced will not be applied to the meter 34. This blocking of undulation 51 is indicated at 51a.

While we have shown and described the principles of our invention in connection with specific apparatus, we recognize that various changes and modifications may be made therein without departing from the invention. For example, instead of maximizing, the system may be arranged to give pulse width measurements by a minimizing operation. It is our aim therefore to cover in the appended claims all such changes and modifications as fall within the scope of the invention.

We claim:

1. A method of measuring the duration of pulses of a given shape having abrupt changes at the leading and trailing edges thereof, comprising shock exciting a resonant circuit by the leading and trailing edges of a train of such pulses, the oscillations initiated by the edges of each pulse combining to form an undulation following the trailing edge of the pulse, damping out the oscillations which normally follow said undulation so that the oscillations produced by one pulse will not affect the oscillations produced by the next succeeding pulse, and tuning the circuit until the undulation reaches a size limit such as its greatest maximum, whereby one-half the period of the frequency to which the circuit is tuned represents a timing at a given multiple of the duration of the pulse.

2. The method defined in claim 1, wherein the damping out of oscillations is controlled by a given polarity condition across the tuned circuit after occurrence of each pulse.

3. The method defined in claim 1, wherein the damping out of the oscillations is produced by blocking the energy of the oscillations when the energy changes polarity at the end of said undulation.

4. A system for measuring the duration of a pulse comprising a shock excitable circuit, means to apply a train of the pulses to the circuit to produce separate oscillations therein in response to the leading and trailing edges of each of the pulses, the oscillations initiated by the leading and trailing edges of each pulse combining to form an undulation following the trailing edge of the pulse, means to damp out the oscillations which normally follow said undulation so that the oscillations of one pulse will not affect oscillations produced by the next succeeding pulse, means to indicate energy of said undulation, and means to tune the circuit until said undulation reaches a size limit such as its greatest maximum, whereby one-half the period of the frequency at which the circuit is tuned represents a given multiple of the duration of the pulse.

5. The system defined in claim 4, wherein the means to damp out the oscillations comprises a low resistance shunt connection across said circuit and means responsive to energy of said pulse to control the blocking and unblocking of said shunt connection.

6. The system defined in claim 4, wherein the means to damp out the oscillations comprises a low resistance shunt connection across said circuit and means responsive to energy of said pulse and oscillatory energy from said circuit of polarity opposite the polarity of said undulation to block the shunt connection.

7. The system defined in claim 4, wherein the means to damp out the oscillations comprises a vacuum tube connected across said circuit, and means to bias the tube to cut-off for the duration of the pulse, the polarity of the circuit connections across the tube being such during the formation of said undulation as to maintain the tube at cut-off for the duration of said undulation and the change in polarity of said connections at the end of said undulation operating to produce conduction in said tube to shunt said circuit.

8. The system defined in claim 4, wherein the means for indicating energy of said undulation includes an amplifier arranged to threshold clip the undulations.

9. The system defined in claim 4, wherein the means for indicating energy of said undulation includes an amplifier arranged to threshold clip the undulations and means connected to the input of the shock excitable circuit to apply the energy of the pulses to the amplifier to block operation thereof for the duration of each of the pulses so that undulations produced by the leading edge prior the occurrence of the trailing edge of a pulse will not be passed by said amplifier.

10. A system for translating the pulses of a train of like pulses into undulations comprising a shock excitable circuit, means to apply the train of pulses to the circuit to produce oscillations therein in response to the leading and trailing edges of each of the pulses, the oscillations initiated by the leading edge of a pulse combining to form an undulation following the trailing edge of the pulse, a vacuum tube having anode, cathode and grid electrodes, means connecting the anode and cathode electrodes across said circuit, and means to apply said train of pulses to said grid electrode to block said tube for the duration of each pulse, the anode and cathode connections being arranged to produce a blocking potential for the tube for the duration of said undulation and an unblocking potential for said tube upon initiation of a voltage having polarity opposite to the polarity of said undulation, whereby said tube damps out oscillatory energy in said circuit following said undulation.

11. A circuit comprising a plurality of circuit elements connected in parallel circuit arrangement, one of said elements being a condenser, a second being an inductance and a third being a damping tube having the cathode and anode electrodes thereof connected in the parallel circuit, a resistor, an input for negative pulses connected through said resistor to said parallel circuit, said tube having a grid, and means connecting said input to said grid.

12. The circuit defined in claim 11, in combination with an energy indicator including an amplifier, and means connecting the parallel circuit to the input of said amplifier.

13. The circuit defined in claim 11 in combination with an energy indicator including an amplifier, means connecting the parallel circuit to the input of said amplifier, and means to connect the input to said parallel circuit to said amplifier to maintain the amplifier block during application of a negative pulse to the input of said circuit.

EMILE LABIN.
DONALD D. GRIEG.